US008820639B2

(12) United States Patent
Haddock

(10) Patent No.: US 8,820,639 B2
(45) Date of Patent: Sep. 2, 2014

(54) SECURITY FEATURE RFID CARD

(75) Inventor: Richard M. Haddock, Redwood City, CA (US)

(73) Assignee: ASSA Abloy AB (SE)

( * ) Notice: Subject to any disclaimer, the term of this patent is extended or adjusted under 35 U.S.C. 154(b) by 1363 days.

(21) Appl. No.: 11/934,683

(22) Filed: Nov. 2, 2007

(65) Prior Publication Data
US 2008/0121710 A1    May 29, 2008

Related U.S. Application Data

(60) Provisional application No. 60/864,370, filed on Nov. 3, 2006.

(51) Int. Cl.
| G08B 13/14 | (2006.01) |
| G06K 19/00 | (2006.01) |
| G06K 7/00 | (2006.01) |
| G06F 17/00 | (2006.01) |
| G06K 19/06 | (2006.01) |
| G05B 19/00 | (2006.01) |
| H04Q 5/22 | (2006.01) |

(52) U.S. Cl.
USPC ........... 235/440; 235/487; 235/492; 235/493; 235/380; 235/375; 340/572.1; 340/5.31; 340/5.8; 340/10.5

(58) Field of Classification Search
CPC ....... G08B 13/14; G06K 19/00; G06K 7/008; G06K 19/06; B60R 25/04; B60R 25/24; G06F 21/88; G06F 21/554; G07C 9/0069; G07C 9/00111; H04Q 5/22

USPC ......... 235/487, 492, 493, 380, 440; 340/5.31, 340/5.8, 10.5, 572.1
See application file for complete search history.

(56) References Cited

U.S. PATENT DOCUMENTS

| 4,442,507 A | 4/1984 | Roesner |
| 4,796,074 A | 1/1989 | Roesner |
| 5,095,362 A | 3/1992 | Roesner |
| 5,296,722 A | 3/1994 | Potash et al. |
| 5,347,280 A | 9/1994 | Schuermann |
| 5,378,880 A | 1/1995 | Eberhardt |
| 5,379,134 A | 1/1995 | Manitakos |
| 5,407,851 A | 4/1995 | Roesner |
| 5,521,601 A | 5/1996 | Kandlur et al. |
| 5,528,222 A | 6/1996 | Moskowitz et al. |
| 5,541,604 A | 7/1996 | Meier |
| 5,550,547 A | 8/1996 | Chan et al. |
| 5,563,401 A * | 10/1996 | Lemelson ..................... 235/494 |
| 5,565,846 A | 10/1996 | Geiszler et al. |
| 5,625,341 A | 4/1997 | Giles et al. |

(Continued)

FOREIGN PATENT DOCUMENTS

| EP | 0494114 B1 | 7/1992 |
| EP | 0585132 B1 | 3/1994 |

(Continued)

*Primary Examiner* — Daniel Walsh
(74) *Attorney, Agent, or Firm* — Sheridan Ross P.C.

(57) ABSTRACT

A reader and method to allow verification or access to an RFID component of a device using analog optical properties of the RFID device. In the method, a reader analyzes optical properties of the device, obtains information on these properties from the reader or from data on the device. These optical analog properties are required to be verified prior to access to the RFID data from the RFID component.

12 Claims, 3 Drawing Sheets

(56) References Cited

U.S. PATENT DOCUMENTS

| | | | |
|---|---|---|---|
| 5,682,143 A | 10/1997 | Brady et al. | |
| 5,694,471 A | 12/1997 | Chen et al. | |
| 5,822,071 A | 10/1998 | Dosmann et al. | |
| 6,119,621 A | 9/2000 | Johnson | |
| 6,206,292 B1* | 3/2001 | Robertz et al. | 235/488 |
| 6,264,106 B1* | 7/2001 | Bridgelall | 235/462.46 |
| 6,369,711 B1* | 4/2002 | Adams et al. | 340/572.1 |
| 6,415,978 B1* | 7/2002 | McAllister | 235/462.01 |
| 6,557,766 B1* | 5/2003 | Leighton | 235/488 |
| 6,747,546 B1* | 6/2004 | Hikita et al. | 340/10.31 |
| 6,842,106 B2 | 1/2005 | Hughes et al. | |
| 6,970,088 B2 | 11/2005 | Kovach | |
| 7,055,756 B2 | 6/2006 | Anderson et al. | |
| 7,066,388 B2* | 6/2006 | He | 235/383 |
| 7,070,112 B2 | 7/2006 | Beenau et al. | |
| 7,076,083 B2* | 7/2006 | Blazey | 382/100 |
| 7,083,104 B1 | 8/2006 | Empedocles et al. | |
| 7,086,073 B2 | 8/2006 | Benedikt et al. | |
| 7,093,767 B2 | 8/2006 | Faenza, Jr. et al. | |
| 7,095,324 B2 | 8/2006 | Conwell et al. | |
| 7,123,151 B2 | 10/2006 | Garber et al. | |
| 7,209,042 B2* | 4/2007 | Martin et al. | 340/572.8 |
| 7,252,235 B2* | 8/2007 | Kucher et al. | 235/462.16 |
| 7,284,704 B2* | 10/2007 | Lubow | 235/462.01 |
| 7,397,378 B1 | 7/2008 | Leason | 340/572.7 |
| 7,474,212 B2* | 1/2009 | Nakagawa et al. | 340/572.1 |
| 7,789,314 B2 | 9/2010 | Karstens | 235/492 |
| 8,360,317 B2* | 1/2013 | Zazzu et al. | 235/440 |
| 2002/0008623 A1* | 1/2002 | Garber et al. | 340/572.1 |
| 2002/0113125 A1* | 8/2002 | Schuessler et al. | 235/462.1 |
| 2002/0113128 A1* | 8/2002 | Heske, III | 235/462.25 |
| 2002/0167397 A1* | 11/2002 | Eroglu et al. | 340/10.6 |
| 2003/0121980 A1* | 7/2003 | Lemelson et al. | 235/462.08 |
| 2003/0146284 A1* | 8/2003 | Schmit et al. | 235/462.44 |
| 2004/0046642 A1* | 3/2004 | Becker et al. | 340/10.32 |
| 2004/0227616 A1* | 11/2004 | Lafferty | 340/5.61 |
| 2005/0010776 A1 | 1/2005 | Kenen et al. | |
| 2005/0174236 A1* | 8/2005 | Brookner | 340/539.26 |
| 2005/0199724 A1* | 9/2005 | Lubow | 235/462.01 |
| 2005/0218215 A1* | 10/2005 | Lauden | 235/380 |
| 2005/0218219 A1* | 10/2005 | Sano et al. | 235/383 |
| 2005/0230478 A1* | 10/2005 | Chapman et al. | 235/462.13 |
| 2005/0230960 A1* | 10/2005 | Bilodeau et al. | 283/75 |
| 2005/0237203 A1* | 10/2005 | Burman et al. | 340/572.8 |
| 2005/0242953 A1* | 11/2005 | Nakagawa et al. | 340/572.1 |
| 2005/0247776 A1* | 11/2005 | Harper et al. | 235/380 |
| 2005/0258939 A1* | 11/2005 | Kantrowitz et al. | 340/10.1 |
| 2005/0274804 A1* | 12/2005 | Matsumoto | 235/462.01 |
| 2006/0017541 A1 | 1/2006 | Nguyen | |
| 2006/0059365 A1* | 3/2006 | Harper | 713/186 |
| 2006/0065714 A1 | 3/2006 | Jesme | |
| 2006/0080819 A1* | 4/2006 | McAllister | 29/403.3 |
| 2006/0139662 A1* | 6/2006 | Sugiyama | 358/1.5 |
| 2006/0145863 A1* | 7/2006 | Martin et al. | 340/572.8 |
| 2006/0145864 A1* | 7/2006 | Jacober et al. | 340/572.8 |
| 2006/0151615 A1* | 7/2006 | Cheng | 235/492 |
| 2006/0199196 A1* | 9/2006 | O'Banion et al. | 435/6 |
| 2006/0202032 A1* | 9/2006 | Kricorissian | 235/435 |
| 2006/0232413 A1* | 10/2006 | Lam et al. | 340/572.1 |
| 2006/0290509 A1* | 12/2006 | Forster et al. | 340/572.3 |
| 2007/0069852 A1* | 3/2007 | Mo et al. | 340/5.1 |
| 2007/0070867 A1* | 3/2007 | Forster et al. | 369/273 |
| 2007/0075861 A1* | 4/2007 | Cook et al. | 340/572.1 |
| 2008/0093448 A1* | 4/2008 | de la Huerga | 235/385 |
| 2008/0100452 A1* | 5/2008 | Lazo | 340/572.7 |
| 2008/0106379 A1* | 5/2008 | Haddock | 340/10.1 |
| 2008/0217409 A1* | 9/2008 | Ito et al. | 235/440 |
| 2008/0256600 A1* | 10/2008 | Schrijen et al. | 726/2 |
| 2008/0265039 A1* | 10/2008 | Skowronek et al. | 235/492 |
| 2009/0057404 A1* | 3/2009 | Karstens | 235/440 |
| 2009/0174528 A1* | 7/2009 | Toda et al. | 340/10.1 |
| 2009/0179744 A1* | 7/2009 | Kean et al. | 340/10.51 |
| 2009/0230199 A1* | 9/2009 | Bove | 235/494 |
| 2009/0231104 A1* | 9/2009 | Kofman et al. | 340/10.1 |
| 2009/0273451 A1* | 11/2009 | Soppera et al. | 340/10.4 |
| 2012/0256732 A1* | 10/2012 | McAllister | 340/10.2 |

FOREIGN PATENT DOCUMENTS

| | | |
|---|---|---|
| EP | 0598624 B1 | 5/1994 |
| EP | 0615285 A2 | 9/1994 |
| EP | 1254398 B1 | 11/2002 |
| EP | 1492095 A2 | 12/2004 |
| WO | 03032300 A3 | 4/2003 |

* cited by examiner

SECURITY FEATURE RFID CARD

CROSS-REFERENCE TO RELATED APPLICATION

This application claims priority from U.S. provisional application No. 60/864,370, filed Nov. 3, 2006.

TECHNICAL FIELD

The invention relates to radio frequency identification (RFID) and, in particular, to a security method and feature for RFID devices.

BACKGROUND OF THE INVENTION

RFID has been widely adopted for unique identification of a product or document. Currently, proposed standards for various identification documents (e.g. passports, driver's licenses) require the addition of an RFID component. The benefits of such technology include relatively low cost to manufacture, the ability to read at a distance, the ability of passive RFID to use induction from a reader to power the device, and increasingly available unique RFID printing technology.

One concern with RFID is security. RFID readers may be able to read the card through a user's pocket or in a purse, compromising card security. It is an object of the invention to provide enhanced methods and devices for security of RFID cards.

SUMMARY

In brief, the various embodiments described allow verification or access to an RFID device using analog optical properties of the RFID device. In the method disclosed, access to the RFID data could be encoded using a hash code or other code keyed to the optical properties. Duplication of the RFID component of the device would not allow access to the data without the optical properties specific to the device.

DETAILED DESCRIPTION

Figure 1:
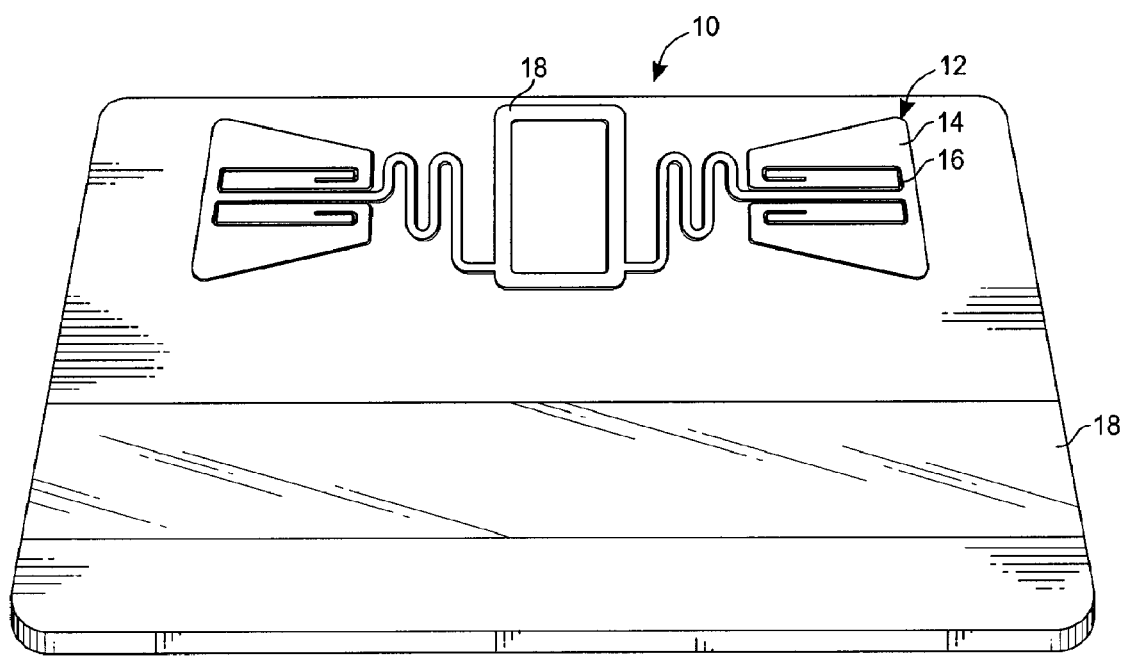
FIG. 1 is a top perspective view of the face of an RFID card.

For RFID tags there are various security concerns including:
1. RFID Tag is stripped off first item, placed onto a second item.
2. Counterfeit RFID Tag is produced. This could be by viewing the antenna, or by detecting the signal through a pocket, envelope, etc. and producing a tag with a matched signal.
3. Reading the RFID Tag without authorization, again through pocket, purse.

The disclosed embodiments prevents all three abuses by use of non-apparent analog optical signal characteristics associated with the device in which the tag is placed to act in cooperation with the RFID signal such that the analog optical signal characteristics are required for the RFID signal to be read.

Embodiments of the present reference seek to make the RFID employing documents more secure by including a non-apparent optically readable component. In various embodiments:

1. The RFID antenna has an optical media portion (or its entirety) that can be optically interrogated to obtain data.
2. The RFID antenna is on or combined with a medium having an optically readable portion. The two portions could still be read at the same time if required.
3. The RFID signal and the optical signal could be read by simply placing an object containing the RFID device in front of a scanner. This could require a fairly large focal range for the reading of the optical portion. For example, the optical portion could retro reflect back. It could have a diffractive pattern and picks up the diffractive pattern and the diffractive order. This could be done at a distance, allowing a user to simply hold up a an object, such as an optical card having an RFID antenna, and scan the card.

The security information would not need to be strictly encoded. Instead, the analog optical information read from the card would be used cooperatively with the RFID card to allow more secure use of the RFID card.

4. The optical signal could be read at a closer distance, requiring the card to be held in a window. This would allow reading of polarization patterns, smaller optical features or patterns, reflective patterns, refractive patterns, etc.
5. The optical signal could be read at a registered distance, as in an optical card reader. This would allow reading of micro scale spots or pits or dots, i.e., contrasting indicia. Again, the optical indicia could provide the security information, or the analog signal characteristics of pits, such as variation in reflectivity, spacing differences, etc. could be used to encode the security information. This would be read from a registered location within an optical recording medium reading device.

In brief, a user would get an RFID item (e.g. a carrier having an RFID chip) out and bring the carrier a suitable distance from the reader. An optical instrument would analyze the carrier and provide analog optical property data. This data could be unique to each item, and specific to the RFID component (e.g. the data could be generated for analysis of a unique RFID antenna for example. The analog optical property data is used to create a unique digital code. The optical properties can be read from a distance, such as the noted diffractive pattern. The optical properties can be used as a key or portion of the unique RF tag identification number registered in the RFID chip.

In one embodiment both the optical information and the RFID electronic data are simultaneously read and combined to form a valid ID message unit. Use of both RF and optical remotely read data eliminates the risk of remotely reading the RF data secretly, such as scanning an ID card when mailed in envelopes to card holders, or scanning a card in a purse or a wallet.

Card could be removed from a wallet and then read both optically and by the RFID reader. This would prevent reading of the card when it is in a person's wallet.

The following describes a method and system for using analog, seemingly random, characteristics of optical media as a "fingerprint" for media identification. For an RFID device, the same analog signal characteristics could be used for a "handshaking" type cooperation with the RF device. Alternatively, the analog optical characteristics could not be from optical media, but could be from a non-optical media portion of the RF device that is visible. In another alternative, some optical properties of the item having an RF component could be imaged or analyzed and this object information used cooperatively with the RF components. Such information could be a paper fiber pattern, ink distribution, fluorescent pattern, quantum nanocrystals, material surface topography information, etc. Examples, are found in U.S. Pat. No. 5,694,471 and U.S. Published Appln. No. 2005/0010776; hereby expressly incorporated by reference for all purposes herein.

Security Handshaking/Public Private Key Pairs

The various embodiments illustrated here are a security handshaking access system with a private key from a public/private encryption pair to be stored in an optical storage media as a first of a security authentication data pair. This overcomes inherent limitations of optical media when used for PKI applications. An optical medium stores data in the form of burned pits, holes, spots, or dots at varying relative spacing. The data content may be represented by a distance from one mark to the next, which may be read to mean a binary (i.e. one or zero). Other data encoding schemes may also be used. Such an optical medium has characteristic analog signal properties. These properties are specific to the analog medium and may be used to create a type of signature of the media. Such characteristics can appear seemingly random so that the ability to microscopically find such differences is quite difficult. In addition, these analog signal differences can be of many different types and may be found throughout the optical media.

In some of the present embodiments, the analog signal characteristics of the optical medium or optical features of a device may be used to convert the generated private key or other identifier into a hash code. This private key hash code may be written into the optical recording medium, effectively creating a private key specific to the unique analog characteristics of a specific object. If a key pair is used, private key itself is never stored on the optical medium, only the hash version is stored on the medium itself.

Creation of RFID Antennas Using Optical Media

Antennas are electrically tuned wires that correspond to wavelengths of interest, usually associated with a connected transmitter or receiver.

Optical media is defined as any material that can store data, and have the data read using light. This could be diffractive, reflective, polarizing, etc. The data density would be appropriate for antenna wire size. In one embodiment, data marks could be placed photolithographically or otherwise created (e.g., ablated) on the antenna itself. The smallest lines that can be made by photolithography are feature size, approximately 2.25 microns, lines. Data spots smaller than feature size are feasible using sidewall mask and other techniques, but if the data marks are feature size, then the associated antenna wires must be larger than this feature size to accommodate data. In other embodiments, no optical media is needed on the RFID antenna. Instead, some analog property at some location is noted. This may be reflectivity, polarization, refraction, wavelength, or any other optically measurable property. This could be an intentional mark, or could be some detectable property of the specific device having the RFID device.

In one embodiment, marks could be placed adjacent to the antenna, or in antenna interstices (such as location 16 in FIG. 1), or adjacent to the antenna. As illustrated in FIG. 1, a combined optical media storage device, (10) including a stripe of optical media (18) having a plurality of parallel tracks suitable for data recording onto said parallel tracks, combined with an antenna. This is similar to the 2.6 megabyte of data card sold by LaserCard Corporation, but with a printed antenna (12) to be connected to an RFID chip. This antenna may be printed using the optical media, with printing producing a tuned element, i.e., antenna. The area of the antenna that is active is shown by traces 14, while the inactive area is shown by area 16. The optical media could be a portion of the actual antenna (element 14) or could be positioned in areas 16 which are not part of the antenna. Tuning requirements would be combined with data storage requirements.

Various patterns may be placed on the antenna area (14), as noted above. Using the phase-based media described above, tracks of laser ablated pits as well as a specified pattern may be included. As another embodiment, embossed metallized holograms may be printed onto the media and may even be included in the master plates that form the media. Pre-encoded data tracks may be formed in the hologram and can be used adjacent to an antenna. If the embossing is on dielectric material, such as plastic film, the optical pattern, hologram or otherwise, can be on a film layer placed over the antenna layer, which can be conductive traces printed on a lower level. The optical pattern need not be embossed on the film but may also be printed, or generated with alternate techniques. Alternatively, feature shapes, fiber or material patterns or optical properties, reflection or absorption patterns could be used to create a unique fingerprint of the article or device having the RFID antenna.

Figure 3:
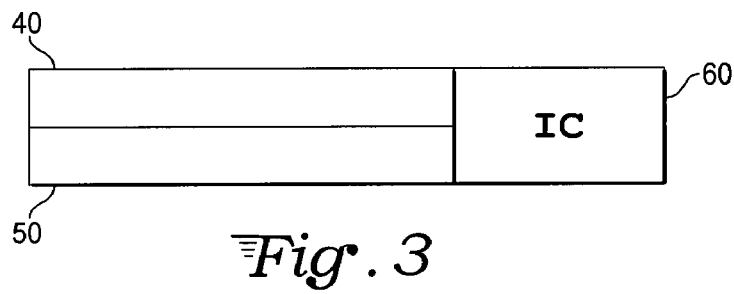
FIG. 3 is a cross section of an RFID card.

In another embodiment, shown in cross-section in FIG. 3, the RF antenna is printed on an under layer (50), while the optical media is on an upper layer (40). A side section holds the integrated circuit (60). Both the upper layer and the lower layer may be inexpensive printed materials, combined to form a RFID tag or document. An optical property of the upper layer in other embodiments need not have an optical media. Even if the RFID tag is not visible, an optical property of the card could be used to verify that the RFID signal is genuine.

A commercial radio frequency chip card, of the type having an antenna such as an RF transceiver chip on a substrate layer, is at a first generally planar level. A second layer of dielectric sheet material, not larger than the card of the first level overlies the chip card, and is adhered to the chip card, such as by lamination. The second layer could be stamped or printed with optical indicia or optical analog signals could be generated by the optical interrogation of the surface of the device. Information from the second layer is combined with information on the first layer to authenticate the RFID device and allow access to RFID data. Thus, even if the chip card is cloned, the clone would not have the second layer and could not be authenticated.

Figure 2B:
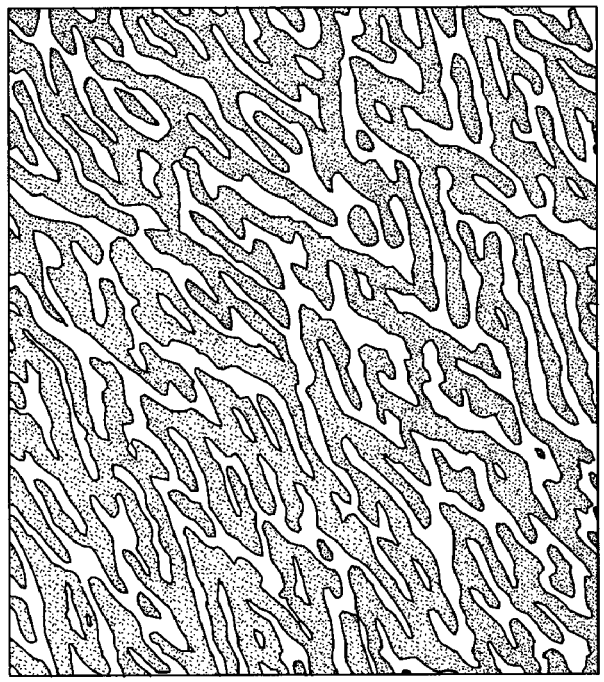
FIG. 2b is a image derived from a refractive pattern.
Figure 2A:
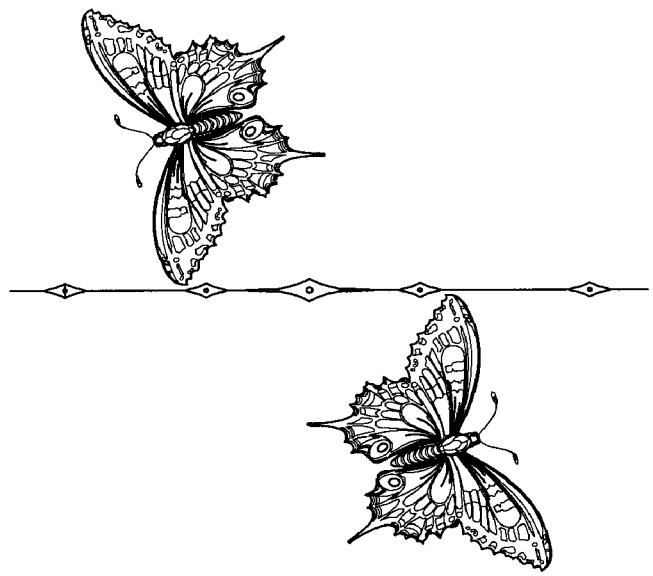
FIG. 2a is a refractive pattern of an RFID device.

The optical media of the antenna, or alternatively, optical media on the other part of the card, may include a diffractive pattern. Such a diffractive pattern may also be used for security verification of the card. These patterns may be encoded with a roughly one micron pixel resolution. Such patterns look essentially random, as illustrated in FIG. 2A; however, when laser light is directed onto the diffractive pattern a picture is reflected from the optical media and is visible on a flat surface. FIG. 2B is a pattern generated by such a diffractive area.

Media

The media used by LaserCard utilizes a silver halide compound similar to that use in photographic applications. An alternate form of optically writeable and readable media can be used for data storage and is compatible with current LaserCard data storage technology. This media has two properties: first, it can be written and read such that it is adaptable to WORM applications. Second, the conductivity is adaptable for use as an RFID antenna. Such a combination has a number of benefits.

One example of such a media is an optical phase readout based media, similar to CDR or DVDR media, where three dimensional pre-encoded information is formed by techniques such as embossing, followed by sputter coating a WORM layer over the molded layer. The sputter coating is a metallic based material, which can be manufactured in two ways. In the first manufacturing method, a "Write Bright" media results, such that when writing with a laser to record information, the material is not melted but the crystalline structure is altered such that the pit becomes reflective. This would be read as one bit of information. Alternatively, in a second manufacturing method, a "Write Dark" media results from changing the thermal conductivity characteristics such that the laser melts the surface; melting the metallic surface away such that it is no longer reflective to the same degree, and the pits are less reflective. This may be preferred because it mimics the existing silver halide media that is also Write Dark. This would allow use of the new media using existing read/write, or read only instruments. The tracks could be formatted so that existing tracking components and software could be used.

The media in the above example is angstroms thick (e.g. 50-200 A), and the laser burns entirely through a pit data location to add data.

Additionally, a number of different materials may be used.

As noted, the optical media may be a variety of different materials. These include an optically variable metal film. This would include a metal film capable of laser recording. This would include films having Write Once Read Many (WORM) properties.

In addition, a number of the possible media types are adaptable to higher density, including, but not limited to CD, DVD, or Blu Ray compatible optical media.

RFID

Radio frequency identification (RFID) is an automatic data transmission method. It relies on storing and remotely retrieving data using devices sometimes referred to as RFID tags or transponders. An RFID tag is an element that can be attached to an object and later powered to produce data. The RFID tags generally have two components: an antenna component and a silicon chip component. Passive tags require no internal power source, while active tags require a battery or other power source.

For passive RFID tags, a small electrical current is induced in the antenna by an incoming radio frequency signal. This radio frequency signal is from the RFID tag interrogation unit. The induced current provides sufficient power for the integrated circuit component to have enough power to transmit a response. This low power means that the device operates over a very short range. Thus, the antenna must be designed both to produce the power by an induced current, and to transmit the signal to an external read device. The information transmitted can be identification data, or the RFID tag may have a chip that can contain a non-volatile memory for storing additional data.

The lack of an integrated power supply means that these RFID devices can be quite small, making them adaptable for simple printing using commercial available RFID printers. Such tags may be made from silicon semiconductor, or non-silicon polymer semiconductors.

The alternative to passive RFID tags are active RFID tags, which have a power source. The active power source provides the ability to operate over a longer range, by transmitting at higher power levels, and accommodate in environments where transmission requires higher power.

An RFID system is designed to enable an RFID tag to be read by an RFID reader, providing data specific to the RFID tag. For example, on a passport an RFID tag may provide data specific to the user, namely biometric data such as height, eye color, weight, etc., passport number, immigration status, or other relevant document information. This information is stored in a memory chip connected to the antenna. When the tag is sufficiently proximate to an electromagnetic zone it will detect readers activation signal. For a passive tag, this signal is sufficient to induce power in the antenna, extract information from the chip, and transmit information back to the reader.

RFID passports are governed by standards that have been set by standard setting organizations such as the International Civil Aviation Organization (ICAO).

At least some of the optical media listed in the media section above have conductive properties. These vacuum coated media allow pre-encoded information to be stored on the media. The antenna may include parallel recorded/recordable data tracks. The auto track function of existing readers could be used to read RFID antenna tracks recorded if the RFID antenna is made of optical media.

Radio frequency identification technology has been developed by a number of companies, including Motorola/Indala (see U.S. Pat. Nos. 5,378,880 and 5,565,846), Texas Instruments (see U.S. Pat. Nos. 5,347,280 and 5,541,604), Mikron/Philips Semiconductors, Single Chip Systems (see U.S. Pat. Nos. 4,442,507; 4,796,074; 5,095,362; 5,296,722; and 5,407,851, CSIR (see European document numbers 0 494 114 A2; 0 585 132 A1; 0 598 624 A1; and 0 615 285 A2, IBM (see U.S. Pat. Nos. 5,528,222; 5,550,547; 5,521,601; and 5,682,143, and Sensormatic Elecytronics (see U.S. Pat. No. 5,625,341). All of these patents are hereby incorporated by reference, for all purposes herein.

These tags all attempt to provide remote identification without the need for a battery. They operate at frequencies ranging from 125 KHz to 2.45 GHz. The lower frequency tags (~125 KHz) are moderately resistant to shielding, but have only limited radio frequency functionality due to bandwidth constraints. In particular, systems based on these markers generally operate reliably only when a single tag is in the interrogation zone at a time. They also tend to be relatively bulky and expensive to manufacture. At high frequencies, (typically 13.56 MHz, 915 MHz, and 2.45 GHz), the added bandwidth available has permitted the development of systems which can reliably process multiple tags in the interrogation zone in a short period of time.

Holograms

One form of optical media are holograms. One possible implementation, allows a variety of different patterns to be incorporated onto a device. Thus, pits of data may be burned into the media producing bits of data, or alternatively, patterns may be formed into the media. These three-dimensional patterns may also store information. This would include embossed metallized holograms. These holograms may be formed simultaneously with pre-encoded data, thus in addition to pits or used alone, the holograms may be burned into the media. The optical media could include holograms, pre-encoded pits or burn pits, or any combination of these.

The inclusion of various patterns may allow optical data storage in 3-D. The different planes of the pattern would allow storage of information using not only a two-dimensional pattern, but allowing data storage at the various layers in the pattern as well. Holographic data storage may also allow for angle, or wavelength, or displacement, multiplexing for additional data storage density.

For passive RFID, reading may be done at a variety of distances, as long as the distance is sufficiently small to allow induction of the antenna. In one embodiment, reading of the optical media is at 4 mm, as described in various prior patents incorporated by reference above.

The optical media may be shaped in two symmetric, or asymmetric, patterns joined at a point of contact with the IC chip.

Other Forms of the Media

The optical media, of which the antenna is made, may include a metallized holographic pattern. This pattern may be stamped, embossed or created in other manners.

As also noted, the pattern could have a diffractive pattern, to allow optical validation at a distance.

In another embodiment, the thin metallic pattern forming the optical media may contain a micro optical lens.

In another embodiment, the thin metallic pattern forming the optical media may contain retroreflective elements.

In another embodiment, the thin metallic pattern forming the optical media may contain microimaging of microimages, such as text, pictures or other unique shapes and patterns.

In another embodiment, the thin metallic pattern includes pictoral elements arranged in a specific manner, in order to optimize radiation characteristics required for powering the IC chip in contact with two distinctly different patterns.

In other embodiments, the surface may be made of any desired material. An RFID device may even be added to existing documents or objects. The objects could then be optically interrogated at a known location and the analog optical properties from the device analyzed.

Figure 4:
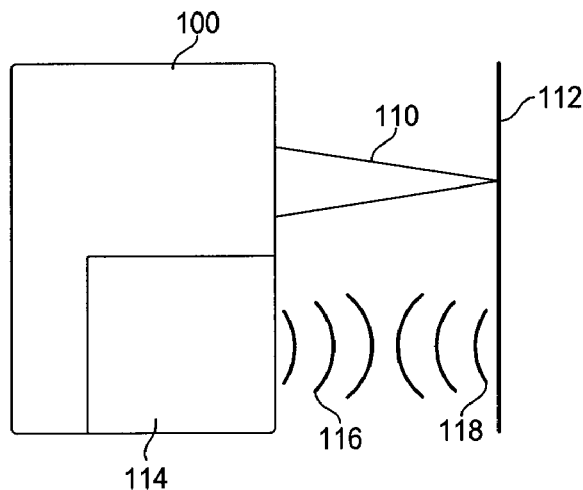
FIG. 4 is a plan view of a reader.

With reference to FIG. 4, a reader 100 produces an optical beam to interrogate device 112. This could interrogation of designed feature, or analyzing of a known optical property at a target location. The optical signal from the interrogated device 112 are read by reader 100. At the same time or sequentially, an RFID reader 114 on reader 100 sends an induction signal 116 to produce an RFID response signal 118 from device 112.

Figure 5:
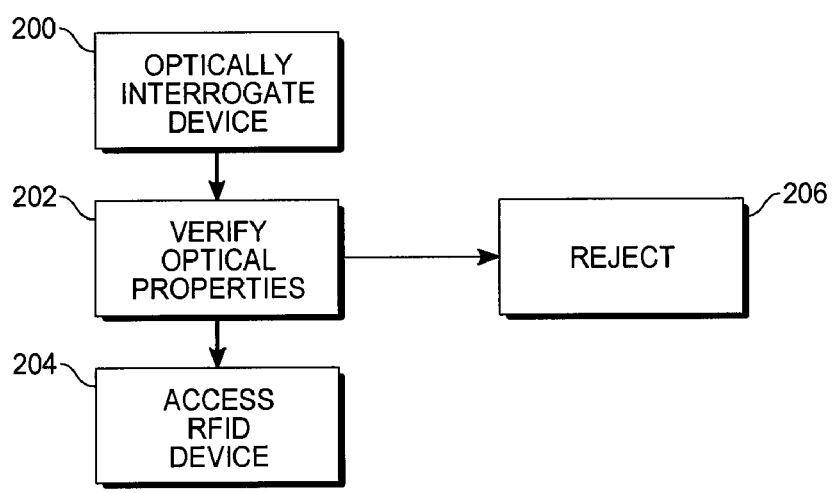
FIG. 5 is a flow chart of the operation of an RFID reader.

With reference to FIG. 5, a flow chart illustrates the steps of the present method. In this method, an initial step requires optically interrogating a device to determine analog optical properties of the device at a target location (step 200). The reader then verifies the optical properties (202). If the optical properties are not verified, the device may be rejected (step 206). Otherwise the analog optical properties are used to access the RFID device. (Step 204).

What is claimed is:

1. A method comprising:
providing an RFID device, the RFID device including an integral card and storing RFID data accessible using an identifier specific to that RFID device, the card having at least one layer with an optical medium supporting writing and reading of data using optical indicia;
reading an optical signal from a location on said optical medium and generating analog optical data, the analog optical data obtained from specified analog optical properties of the optical medium or the optical indicia corresponding to a media fingerprint unique to the particular card, the analog optical data including the identifier specific and unique to the particular RFID device and differing from any data digitally written to the optical medium;
conducting security handshaking between an RFID reader and the RFID device using the optical data to generate and transmit an activation signal to access RFID data on the RFID device the RFID device allowing access by the RFID reader to RFID data stored in the RFID device only if the activation signal includes the identifier specific to that particular RFID device.

2. The method of claim 1, wherein said optical signal is from a specific targeted location on said RFID device.

3. The method of claim 1, wherein said optical signal is from a marked target.

4. A reader for analyzing an RFID device, the RFID device storing RFID data accessible using an identifier specific to that RFID device, comprising:
an optical reader configured to obtain analog optical data from a target on a layer of a card integral with the RFID device, the layer having an optical medium supporting digital writing and reading of data using microscopic pits, spots or other optical indicia, the analog optical data including a media fingerprint of the target and deriving an identifier specific and unique to the RFID device that allows access to RFID data stored in the. RFID device only when presented with an activation signal that includes that identifier, the analog optical data, the media fingerprint and the identifier differing from any data digitally written on the layer using the optical indicia;
an RFID reader able to interrogate the RFID device by transmitting activation signals and reading any RFID data accessed from the RFID device; and
a processor, associated with the optical reader and RFID reader, and configured to use the analog optical data to conduct a security handshaking between the RFID reader and the RFID device by using the analog optical data to generate the activation signal that includes the identifier specific and unique to the RFID device.

5. The method of claim 1 wherein the media fingerprint is of an irregularly varying analog optical property.

6. The method of claim 1 wherein the media fingerprint is unique to each such card.

7. The method of claim 1 wherein the media fingerprint is from a variation; among individual ones of such cards, in the optical medium of at least one of:
a spacing of pits; or
a reflectivity of pits.

8. The reader of claim 4 wherein the analog optical data is data derived from an irregularly varying analog optical characteristic of the target.

9. The reader of claim 4 wherein the media fingerprint is unique to each such card.

10. The reader of claim 4 wherein the optical reader is further configured to read digital data from the optical medium on the card and to obtain the media fingerprint from the optical medium.

11. An RFID device comprising:
a card having at least one layer with an optical medium supporting optical writing and reading of data using microscopic pits, spots or other optical indicia;
an RFID tag attached to the card; and
the optical medium itself or the microscopic pits, spots or other optical indicia thereupon having an irregularly varying analog optical property yielding a media fingerprint unique to each such card and differing from any data written to the card using the optical indicia as binary marks to represent the data;
wherein the RFID tag is activated by an identifier originating from the media fingerprint and any two such cards having identical data written using the optical indicia have differing media fingerprints and differing identifiers.

12. The RFID device of claim 11 wherein the media fingerprint is from a variation, among individual ones of such cards, in the optical medium of at least one of:
a spacing of pits for optical reading; or
a reflectivity of pits for optical reading.

* * * * *